(12) United States Patent
Mansuino et al.

(10) Patent No.: US 11,787,100 B2
(45) Date of Patent: Oct. 17, 2023

(54) PROCESS FOR MAKING A PACKAGE FOR FOODSTUFF PRODUCTS

(71) Applicant: SOREMARTEC S.A., Senningerberg (LU)

(72) Inventors: Sergio Mansuino, Mondovì (IT); Giovanni Bonino, Ricca di Diano d'Alba (IT)

(73) Assignee: SOREMARTEC S.A., Senningerberg (LU)

( * ) Notice: Subject to any disclaimer, the term of this patent is extended or adjusted under 35 U.S.C. 154(b) by 705 days.

(21) Appl. No.: 16/483,945

(22) PCT Filed: Jan. 30, 2018

(86) PCT No.: PCT/IB2018/050553
§ 371 (c)(1),
(2) Date: Aug. 6, 2019

(87) PCT Pub. No.: WO2018/146577
PCT Pub. Date: Aug. 16, 2018

(65) Prior Publication Data
US 2019/0381717 A1 Dec. 19, 2019

(30) Foreign Application Priority Data
Feb. 9, 2017 (LU) ........................................ 100074

(51) Int. Cl.
*B29C 51/08* (2006.01)
*B29C 51/26* (2006.01)
(Continued)

(52) U.S. Cl.
CPC .......... *B29C 51/082* (2013.01); *B29C 51/262* (2013.01); *B29C 51/428* (2013.01);
(Continued)

(58) Field of Classification Search
CPC ....... B29C 51/08; B29C 51/082; B29C 51/26; B29C 51/262; B29C 51/42; B29C 51/428;
(Continued)

(56) References Cited

U.S. PATENT DOCUMENTS

| | | | |
|---|---|---|---|
| 2,997,927 A * | 8/1961 | Carson | B31D 5/02 220/574 |
| 3,010,262 A | 11/1961 | Rumsey | |
| 3,033,434 A * | 5/1962 | Carson | B65D 1/34 220/574 |
| 4,026,458 A * | 5/1977 | Morris | B32B 27/10 493/902 |

(Continued)

FOREIGN PATENT DOCUMENTS

| | | |
|---|---|---|
| DE | 103 02 091 A1 | 8/2004 |
| EP | 1002464 A2 | 5/2000 |
| EP | 2 082 974 A1 | 7/2009 |

OTHER PUBLICATIONS

International Search Report and Written Opinion issued for PCT/IB2018/050553 dated Mar. 14, 2018, 14 pages.

*Primary Examiner* — Yunju Kim
(74) *Attorney, Agent, or Firm* — ROTHWELL, FIGG, ERNST & MANBECK, P.C.

(57) ABSTRACT

A process for making a hermetically sealed package, which includes forming a sheet of wrapping made of plastic material, in particular having a thickness of less than or equal to 140 μm. The process envisages: forming on the sheet a first, hollow, portion and a second, perimetral, portion, which delimits at least partially the first portion; inserting the product into the hollow portion obtained in the sheet of wrapping; applying a second sheet of wrapping in contact with the perimetral portion so as to close the hollow portion with the product inside; and welding the second sheet on the first sheet along the perimetral portion. Forming the first sheet includes providing on the second, perimetral, portion a series of pleats of the sheet, which are then sealed.

8 Claims, 6 Drawing Sheets

(51) Int. Cl.
*B29C 51/42* (2006.01)
*B31B 50/59* (2017.01)
*B65B 11/52* (2006.01)
*B65B 47/06* (2006.01)
*B65B 51/22* (2006.01)

(52) U.S. Cl.
CPC ............... *B31B 50/59* (2017.08); *B65B 11/52* (2013.01); *B65B 47/06* (2013.01); *B65B 51/227* (2013.01)

(58) Field of Classification Search
CPC ..... B29C 33/02; B31B 50/59; B31B 2100/00; B31B 50/44; B31B 50/592; B31F 1/0077; B65B 11/52; B65B 25/005; B65B 47/06; B65B 51/225; B65B 51/227; B32B 38/12
See application file for complete search history.

(56) References Cited

U.S. PATENT DOCUMENTS

| | | | |
|---|---|---|---|
| 4,327,049 A * | 4/1982 | Miller | B29C 51/32 |
| | | | 425/298 |
| 4,642,239 A | 2/1987 | Ferrar et al. | |
| 4,897,031 A | 1/1990 | Weder et al. | |
| 5,330,777 A | 7/1994 | Mize, Jr. et al. | |
| 5,992,619 A | 11/1999 | Milano | |
| 7,516,598 B2 * | 4/2009 | Merken-Schiller | B29C 51/262 |
| | | | 264/239 |
| 2002/0023336 A1 | 2/2002 | Weder | |
| 2005/0023718 A1 | 2/2005 | Wood et al. | |
| 2017/0305097 A1 * | 10/2017 | Räsänen | B31F 1/0077 |

* cited by examiner

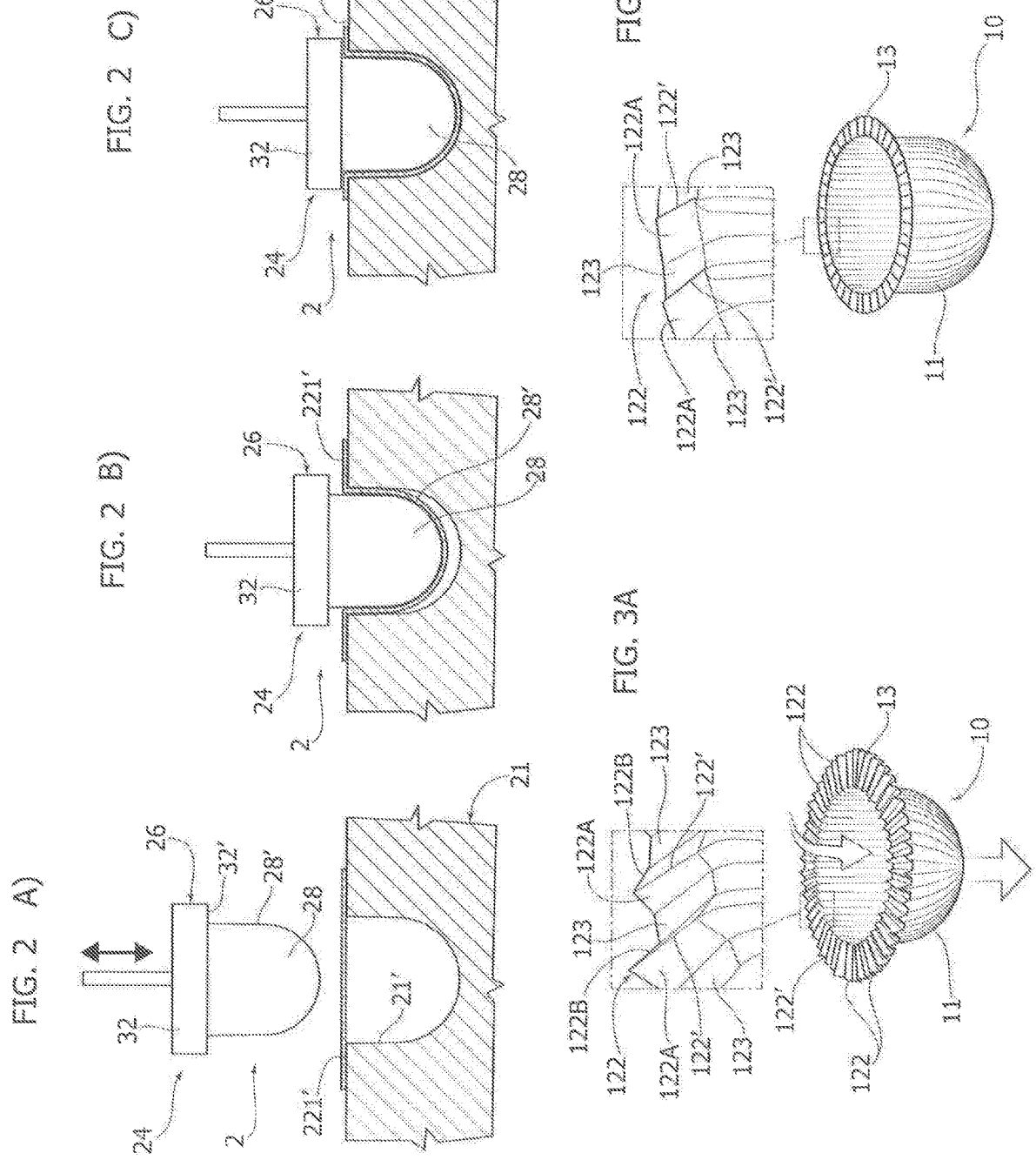

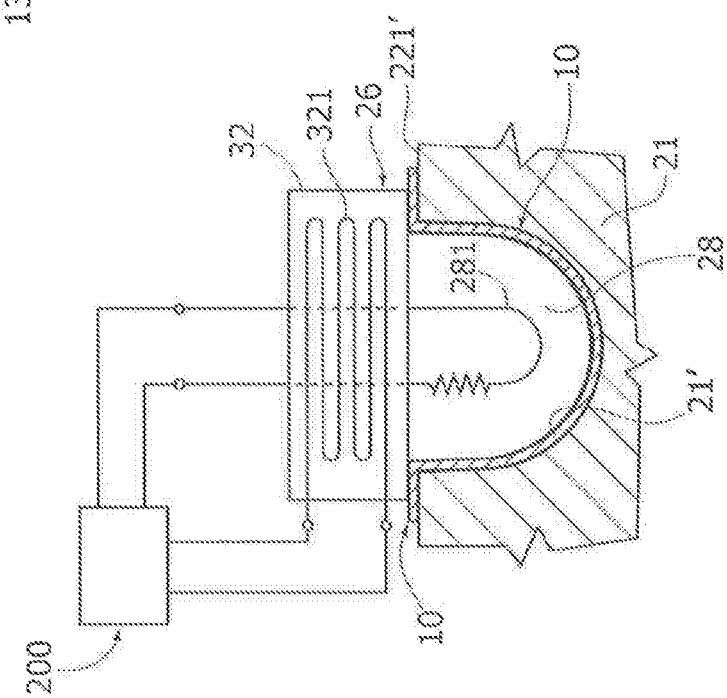
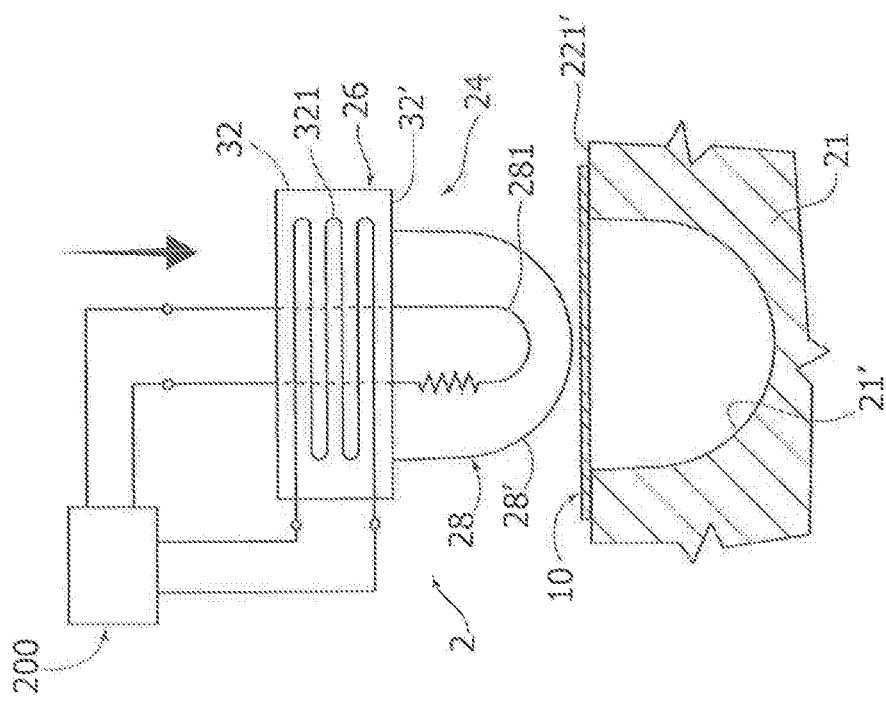

PROCESS FOR MAKING A PACKAGE FOR FOODSTUFF PRODUCTS

CROSS REFERENCE TO RELATED APPLICATION

This application is a 35 U.S.C. § 371 National Phase Entry Application from PCT/IB2018/050553, filed on Jan. 30, 2018, and designating the United States, which claims the benefit of Luxembourgian Patent Application No. 100074 filed on Feb. 9, 2017 with the Luxembourgian Intellectual Property Office, the disclosures of which are herein incorporated by references in their entirety.

FIELD OF THE INVENTION

The present invention relates to a process for making a package for foodstuff products, preferably confectionery products.

In particular, the process here described, includes:
- providing a first sheet of wrapping, made of plastic material, and forming therein at least one first, hollow, portion, which is delimited, at least partially, by a second, perimetral, portion of said sheet;
- inserting a foodstuff product within said first, hollow, portion;
- applying a second sheet of wrapping in contact with said second, perimetral, portion so as to close said hollow portion with said product inside; and
- welding said second sheet on said first sheet along said second, perimetral, portion.

PRIOR ART

Conventionally, processes of the type in question use thermoforming for forming wrapping sheets made of plastic material.

In general, this type of process envisages heating the sheet and, subsequently or simultaneously, subjecting it to a moulding operation within a mould, which has a moulding surface corresponding to the shape to be obtained on the sheet. The moulding operation can be obtained according to two main modalities, namely, via pneumatic means (operating in a vacuum or under pressure) that are designed to generate a difference in pressure between the two opposite faces of the sheet set on the mould, which is able to push the sheet against the surface of the mould, or else via a punch, whether heated or not, which, instead, pushes the sheet mechanically against the surface of the mould, through an outer surface thereof having a complementary shape.

Packages obtained via a process of the type referred to are, for example, described in the documents Nos. U.S. Pat. Nos. 4,642,239, 3,010,262, 5,330,777.

The further documents Nos. U.S. Pat. No. 5,992,619 and EP1002464 regard in particular two packages for confectionery products, which are also obtained using a thermoforming process.

Technical Problem and Object of the Invention

It will now be noted that the packages produced via processes of the type referred to are all obtained starting from relatively thick sheets, in particular ones having a thickness generally greater than or equal to 150 µm, which, on account of their thickness, are either rigid or semirigid—in the sense that they have a structure and consistency such as to be "self-supporting".

The present applicant has noted, instead, that the same type of process is not able to yield satisfactory results as regards production of packages starting from thin plastic sheets. Understood herein by "thin" are sheets having a total thickness of less than 140 µm, in particular equal to or less than 50 µm.

Sheets of this sort are characterized in that they are flexible and more sensitive to heat.

The object of the present invention is hence to solve the problem mentioned above. In this connection, the present invention regards a process, a forming device, and a package as described herein and claimed.

The claims form an integral part of the technical teaching provided herein in relation to the invention.

Further characteristics and advantages of the invention will emerge clearly from the ensuing description with reference to the annexed drawings, which are provided purely by way of non-limiting example and in which:

FIG. 1 illustrates an example of package for confectionery products;

FIGS. 2A)-C) are a sequence of schematic illustrations of sheet forming according to an embodiment of the process described herein;

FIGS. 3A and 3B illustrate a sheet of wrapping in two different instants of the process of FIGS. 2A)-C);

FIGS. 4A)-C) are a sequence of schematic illustrations of sheet forming according to a further embodiment of the process described herein;

Figure 1:
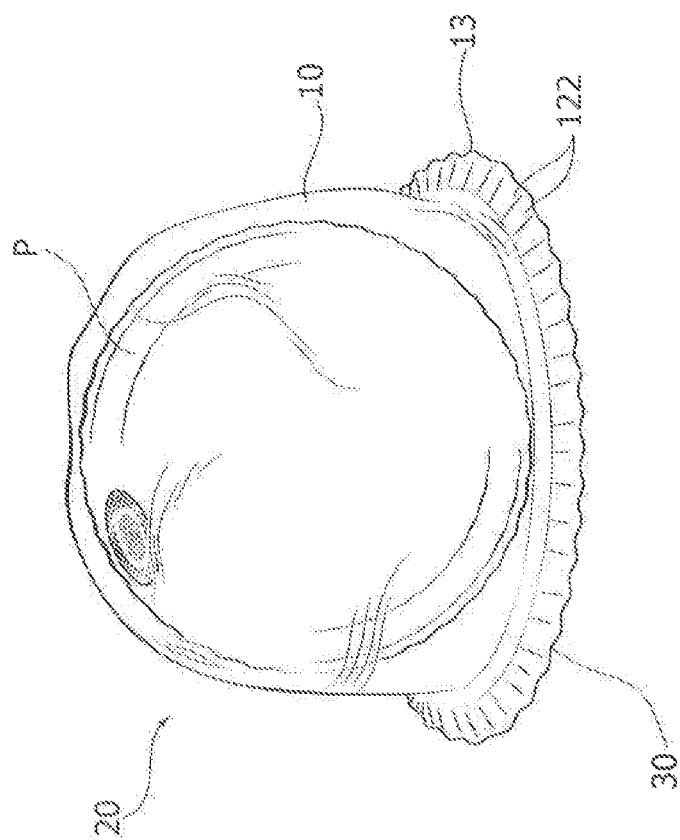

In the ensuing description various specific details are illustrated aimed at providing an in-depth understanding of the embodiments. The embodiments may be obtained without one or more of the specific details, or with other methods, components, or materials, etc. In other cases, known structures, materials, or operations are not illustrated or described in detail so that various aspects of the embodiment will not be obscured.

The references used herein are provided merely for convenience and hence do not define the sphere of protection or the scope of the embodiments.

As mentioned above, the present invention relates to a process for making a package for foodstuff products, preferably confectionery products.

The process includes forming a thin sheet of wrapping made of plastic material, in particular a plastic sheet having a thickness equal to or less than 140 µm, preferably less than or equal to 50 µm.

The field of main interest of the solution described herein is the foodstuffs sector.

In this connection, it should be noted that in this field sheets of the above type are commonly used for providing packages of a flow-pack type, sachets, bags, etc. In these applications, the sheet is simply folded on itself and/or coupled to another sheet of the same type or of a different type so as to define a housing for the product or products to be packaged.

On the other hand, carrying out on such thin sheets, instead, a forming process presents a whole series of problems.

In this connection, see now FIGS. 9A)-D), which illustrate at a schematic level a hot-forming process of a conventional type for obtaining a shaped sheet 100.

The sheet 100 has a tray-shaped central portion 101 and a peripheral plane portion 103, which extends along the outer perimeter of the central portion 101.

The sheet 100 may, for example, represent a container for foodstuffs, which is designed to be closed by way of a sealing foil fixed along the portion 103, for example, via welding or gluing.

The known process represented envisages the use of a mould 105, which is provided with a cavity defining the mould surface 105', and of a punch 107, which has on its end a forming body 107' having a shape complementary to that of the mould surface 105'.

Provided upstream of the mould 105 and of the punch 107, are means 109 for heating the sheet 100 still to be formed, so as to soften it.

The softened sheet 100—step A)—is set on the mould 105 in an area corresponding to the mould surface 105'—step B)—and, whilst it is kept in this position via auxiliary means (not illustrated), its central portion is pushed by the punch 107 against the mould surface 105' so as to adhere perfectly thereto—step C).

This action stretches and plastically deforms the sheet, which hence assumes, in a permanent way, the configuration obtained thereon within the mould.

Figure 9:
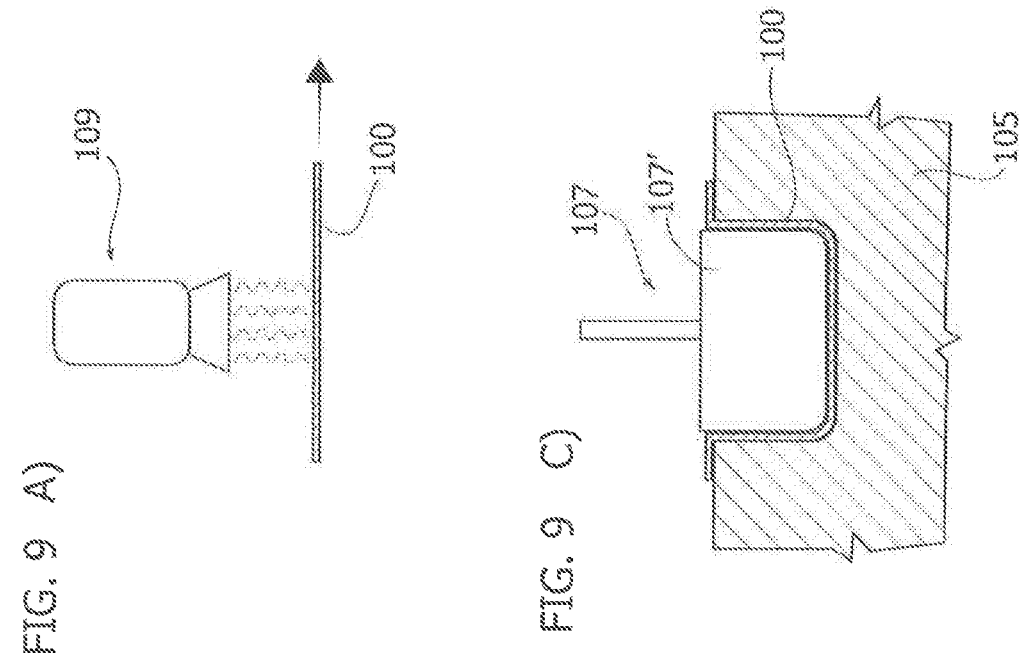
FIGS. 9A)-D) are a sequence of schematic illustrations of a process of hot forming according to the prior art.

The result obtained is precisely the shaped sheet 100, illustrated in FIG. 9—final step D). The portion 105 is the result of the deformation that has taken place within the mould, whereas the peripheral portion 103 represents the part of the sheet that has remained out of the mould cavity.

Now, the implementation of this process on thin sheets leads in general to a series of drawbacks.

First of all, it should be noted that sheets of this type have a marked elastic behaviour so that they tend to return into their original configuration after undergoing deformation.

Application of heat is hence essential for forming these sheets.

However, these sheets can be easily damaged, for example get creased, by the heat transmitted by the heating means mentioned above, on account of their weak consistency due to the small thickness.

If, instead, the operating temperature of these heating means is limited to prevent this problem, it is not possible to guarantee that the sheets maintain the shape obtained within the mould, on account, precisely, of their elastic behaviour.

The present applicant has found that a good compromise between these two conflicting needs does not appear to be achievable with the known processes, above all in the industrial processes that need in any case to meet given requirements in terms of productivity and quality of production.

The present invention solves the problems referred to via a forming process that, in general, envisages the following steps:
providing a sheet of wrapping;
providing a mould having a mould cavity;
providing a forming device designed to co-operate with said mould cavity for forming said sheet; and
setting said sheet on said mould and obtaining on said sheet, via said forming device, at least one first, hollow, portion that is delimited, at least partially, by a second, peripheral or perimetral, portion of said sheet.

The forming process described herein further comprises the steps of:
providing said mould with a mould surface that surrounds said mould cavity;
providing a forming body configured for pressing said sheet of wrapping against said mould surface;
during said step of formation of said first, hollow, portion, forming on said second portion a series of pleats identified by respective folding lines of said sheet of wrapping—having a generally irregular shape—that are oriented towards said hollow portion; and
via said forming body, welding said pleats so as to prevent opening thereof.

In various preferred embodiments, the forming process described herein envisages the steps of:
while said pleats are formed or after said pleats have been formed, squeezing said pleats against said mould surface; and
fixing said pleats squeezed against said mould surface in said position, via welding.

The forming process described herein hence envisages that the sheet of wrapping will not be deformed by stretching within the mould cavity as in traditional processes, but instead will be pressed against the walls of the cavity so as to reproduce the shape thereof, substantially in the absence of internal stresses. In this condition, in passing from a substantially planar geometry to a hollow geometry, on the sheet the aforementioned series of pleats are generated, in particular at its peripheral portion that surrounds the hollow portion and, possibly, also on the walls of the hollow portion itself.

The forming process described herein then envisages fixing the pleats present on the peripheral portion of the sheet via welding.

Welding of the pleats prevents elastic return of the sheet, and this is hence kept in a permanent way in the conformation imposed thereon within the cavity of the mould.

In general, the operation of welding of the pleats can be obtained in a wide range of ways, amongst which heat sealing, ultrasound welding, induction welding, using current pulses, cold-sealing lacquers, etc.

In view of the foregoing, the process described herein hence does not subject the sheet to any mechanical and/or thermal treatment that would risk causing damage thereto or jeopardizing the structure thereof.

Instead, it generally exploits the pleats obtained on the sheet as formations of reinforcement of its overall structure, and it is only along the peripheral portion of the sheet, which is completely marked by these pleats, that the aforementioned welding operation is carried out.

It should be noted that the forming device mentioned may envisage, for the formation of the hollow portion of the shaped sheet, either a forming body that then presses the sheet in the mould cavity, in a way similar to the device of the prior art illustrated in FIGS. 9A)-D), or else, for example, pneumatic means designed to generate a difference in pressure between the two opposite faces of the sheet set on the mould so that the sheet is pushed into the cavity as a result of this difference in pressure. In any case, as will be seen in what follows, the use of a forming body is the preferred modality. In this case, the aforementioned forming device will comprise a single forming body or a number of forming bodies prearranged both for formation of the hollow portion of the sheet and for formation of its peripheral portion.

The sheet of wrapping that can be used in the process may be made of any weldable polymeric material, and possibly may also have a multilayered laminar structure obtained by co-extrusion, rolling, coupling, etc. Preferred polymeric materials are, for example, polypropylene, polyethylene, polyester, polyamide, etc. Possibly, the sheet of wrapping may be coated with glues or heat- or cold-sealing lacquers, and in certain applications it may also be metallized, or made of a metal material such as aluminium.

As will be seen hereinafter, in order to make the complete package the process described herein also envisages the following additional steps:

inserting the product into said hollow portion obtained in the sheet of wrapping;

applying a second sheet of wrapping in contact with said peripheral portion so as to close said hollow portion with said product inside; and welding said second sheet on said first sheet along said peripheral portion.

The product may in turn be already wrapped in a primary wrapping or else may be an unwrapped product. With reference now to FIGS. 2A)-C), this is a schematic representation of an example of implementation of the forming process described herein.

The process illustrated operates for obtaining a shaped sheet 10 comprising a shaped hollow portion 11 and a peripheral portion 13 that surrounds it. Clearly, the portions 11 and 13 may have any shape (e.g., half-egg shape, tray shape either hemispherical, cylindrical, conical, pyramidal, or polygonal, or with any hollow shape that is able to receive chocolate, etc.), so that the configurations represented in the figures are to be considered merely as examples.

The forming station 2 designed to implement the process comprises a mould 21, which is provided with a cavity defining an internal mould surface 21', and an outer mould surface 221', which surrounds the cavity of the mould. It should be noted that it is not necessary for the mould surface 21' to reproduce the entire shape that is to be obtained on the sheet; for example, in the case of the embodiment illustrated, the surface 21' may even be a bottomless cylindrical surface that traverses the mould completely, so that only the cylindrical portion of the shaped sheet is formed in contact with this surface, whereas its domed portion is in contact just with the punch.

The station 2 further comprises a forming device 24 that is provided with a punch 26, and operating means (not illustrated) designed to move the punch vertically.

The punch 26 has, in an end position, a forming body 28, the outer surface 28' of which has a shape complementary to that of the mould surface 21'.

In particular, the two surfaces 21' and 28' are shaped to define between them a gap within which the plastic sheet is forced during the moulding operation. The portion 11 of the shaped sheet will hence present a shape corresponding to the above gap.

The punch 26 is moreover provided with a further body 32, which has the function of setting itself in contact, through a bottom edge 32' thereof, with what will constitute the portion 13 of the shaped sheet and pressing it against the plane surface 221' of the mould.

Now, the operation of forming implemented using the system described envisages the initial step of setting a sheet 10 on the surface 221' of the mould, above the cavity of this (step A of FIG. 2).

Once the sheet is positioned, the forming device operates the punch 26, which engages the sheet and pushes it against the mould 21. In particular, the body 28 will press on the central portion of the sheet with its surface 28' and will push it against the surface 21' of the mould.

As mentioned above, during operation of the punch 26 (step B of FIG. 2), on the sheet a series of pleats 122 are formed that are defined by folding lines 122' directed in a transverse direction with respect to the contour in plan view of the cavity of the mould. As may be seen in FIG. 3A, each individual pleat is constituted by two sides 122A, 122B that project beyond the overall plane defined by the sheet and are joined together, precisely, by the respective folding line. It is evident for the person skilled in the sector that, for the pleats in question to be obtained, the sheet 10 must be brought from the plane configuration above the mould 21 to the cup-shaped configuration assumed within the cavity of the mould, not as a result—or in any case not prevalently as a result—of an action of stretching that determines a plastic deformation of the sheet, but rather as a result of a repositioning thereof, precisely from the horizontal condition above the mould to the condition within the cavity thereof. It may be noted that the representation of the pleats 122 shown in FIGS. 3A and 3B is in any case altogether schematic and is provided exclusively by way of example. In particular, in the real process, the pleats will thus not present as orderly and substantially uniform as illustrated, but will rather assume a more irregular shape and a more random arrangement, above all while the process of drawing of the sheet is being carried out.

The pleats 122 may be either on the portion of the sheet that remains outside the cavity of the mould and that will form the portion 13 and on the shaped portion that will form the portion 11.

Once the body 28 has reached the end-of-travel position and presses the sheet against the surface 21', the body 32 presses, instead, with its bottom edge 32', the surrounding portion of the sheet against the surface 221', to weld the pleats and provide the portion 13 (step C of FIG. 2).

Preferably, by way of the body 32, the pleats are pressed and squeezed against the surface 221' of the mould so as to remain contained in the same general plane that will then identify the portion 13 and are welded and fixed in this position. The action of squeezing of the pleats against the surface 221' will cause them to collapse and undergo deformation in a wide range of altogether random ways. According to how the individual pleats will arrange themselves, the welding will join together, completely or partially: i) the two sides 122A, 122B that constitute the individual pleat; and/or ii) a first one of the two sides (e.g., the side 122B, as illustrated in FIG. 3B) and an adjacent part 123 of the sheet that is set between the same pleat and the next one; and/or iii) the other side (the side 122A) and the adjacent part 123; and/or iv) the side 122B with the side 122A of an adjacent pleat and/or the side 122A with the side 122B of an adjacent pleat.

It should now be noted that, according to the experiments conducted by the present applicant, in the majority of cases the pleats 122 are formed and extend both on the portion of the sheet that comes to form the portion 13 and on the portion of the sheet that comes to form the shaped portion 11. As the punch 28 enters the cavity of the mould, the stretches of the pleats already formed are pressed and squeezed, first, against the inner surface 21' of the mould and finally against its outer surface 221', once the punch has reached its end-of-travel position. In particular, in this position, via its edge 32' the punch 26 presses and squeezes the pleats 122 against the surface 221' and welds them in the area corresponding to this surface so as to form the portion 13.

The portion 13 thus obtained extends in a plane that perfectly overlies the surface 221' of the mould and is oriented parallel thereto, and presents on itself the various pleats 122, which are fixed in this plane and are entirely contained therein (FIG. 3B).

As will be seen hereinafter, this conformation of the portion 13 enables the shaped sheet obtained to be then coupled to a further sheet (the sheet 30 of FIG. 8), in a region corresponding to this portion, for example to obtain the package illustrated in FIG. 1.

In some embodiments, the pleats 122 may even simply be welded inside at the corresponding opposed sides 122A and 122B so as to be closed and sealed on themselves in such a way that they cannot re-open.

In the embodiment illustrated in FIG. 2, the bodies 28 and 32 are mobile in a way fixed with respect to one another, so that, in the light of the operation just described, they must be clearly positioned in such a way that, simultaneously, the body 28 reaches its end-of-travel position within the cavity of the mould, and the body 32 comes to bear upon the portion of the sheet supported by the surface 221' of the mould. Alternatively, it is possible to envisage embodiments in which the two bodies in question are operated by two distinct movement systems.

Among other things, it is also possible to envisage alternative embodiments in which the punch 26 comprises a single forming body that presents on itself a part corresponding to the body 28 and a part corresponding to the body 32. As will emerge clearly in what follows, the type of the punch depends also upon the process provided for carrying out welding of the pleats 122.

In this connection, as mentioned previously, the above welding operation may be obtained in various ways.

In various preferred embodiments, this is obtained by heat sealing and, in this regard, FIGS. 4A)-C) illustrate an embodiment of the forming device 24 provided for performing this operation.

In this case, there may be associated to the body 32, in a relationship of heat exchange, electrical heating means, designated by the reference number 321, designed to keep the edge 32' at a pre-set respective operating temperature. These means may be constituted by resistive elements or else by semiconductor elements (e.g., PTC heaters).

The heat transmitted by the body 32 when it is brought into contact with the sheet, softens the outer layers thereof and makes it possible to obtain the internal and external joins mentioned above of the individual pleats.

Alternatively, the electrical heating means may be associated to the surface 221' of the mould, or again, respective electrical heating means may be associated both to the body 32 and to the surface 221' of the mould.

As mentioned above, other possible modalities with which to carry out the welding operation in question are represented by ultrasound welding, induction welding, and in general any other welding process known to the person skilled in the sector that does not operate through heating means.

Also in these cases, it will be the forming device 24 or else the mould, or both, that is/are provided with the means necessary for carrying out the respective welding process. Preferred embodiments may envisage integrating the inductor, in the case of induction welding, or else the sonotrode, in the case of ultrasound welding, directly in the body 32 as illustrated in FIGS. 4A) and B) for the electrical heating means.

A further modality for welding of the pleats 122 envisages, instead, the use of a sheet coated with cold-sealing lacquer so that, in this case, the joins of the pleats are simply determined by mutual contact of the various surfaces of the sheet coated with this lacquer. In this embodiment, the forming device may hence simply comprise just the body 32, without any particular welding means.

In various preferred embodiments, the process described herein also envisages heating the part of the sheet that is engaged by the body 28 in order to facilitate spreading of this against the surface 21' of the mould. In this connection, to return to the embodiment of FIGS. 4A) and B), as described above with reference to the body 32, there may hence also be associated to the body 28—in a relationship of heat exchange—electrical heating means 281, having the function of maintaining the surface 28' at a pre-set operating temperature.

It should be noted that in this case the body 28 is at any event operated at a temperature much lower than that of the body 32, this in order not to risk damaging or jeopardizing the structure of the sheet, in view of its extremely small thickness.

The specific values of temperature for these two bodies may clearly vary for the individual applications. By way of example, it should be noted that for polypropylene sheets having a thickness of approximately 20 µm temperatures of 55° C. for the body 28 and of 105° C. for the body 32 have proven optimal. For other types of materials and/or other ranges of thickness the temperatures considered optimal may obviously depart from these values. In any case, the present applicant has found that a ratio of less than or equal to 1:1,8 between the temperatures in question (measured in degree Celsius) in general constitutes a preferred operating mode.

Once again with reference to the embodiment of FIG. 4A), the forming device 24 has a power-supply unit 200 designed to supply the electrical means referred to above associated to these bodies.

In various preferred embodiments, the unit 200 also acts as control unit for controlling supply of the electrical means in such a way that the aforesaid pre-set temperatures are maintained.

In various preferred embodiments, the control unit is configured for regulating the supply of the electrical means in question on the basis of signals coming from temperature sensors (not illustrated), for example thermocouples, associated to the bodies 28 and 32.

In general, the modalities with which the control unit can regulate the two temperatures in question are multiple; for example, the unit may be configured for regulating the supply voltage or current or else for regulating the average voltage or average current, envisaging cycles of opening and closing of the supply circuit as a function of the desired temperature.

Alternatively, the electrical means in question may envisage integrated on themselves thermal switches or other control means of an equivalent type that perform the same function referred to above as that of the unit 200.

In general, the control provided may also be set for maintaining the operating temperature within a pre-determined range instead of around a given pre-set temperature.

It is moreover clear that it is in any case possible to envisage simpler embodiments, which do not envisage any regulation of the temperature but envisage, instead, pre-set operating parameters in the design stage and in the stage of development of the system, which remain unvaried.

Figure 5:
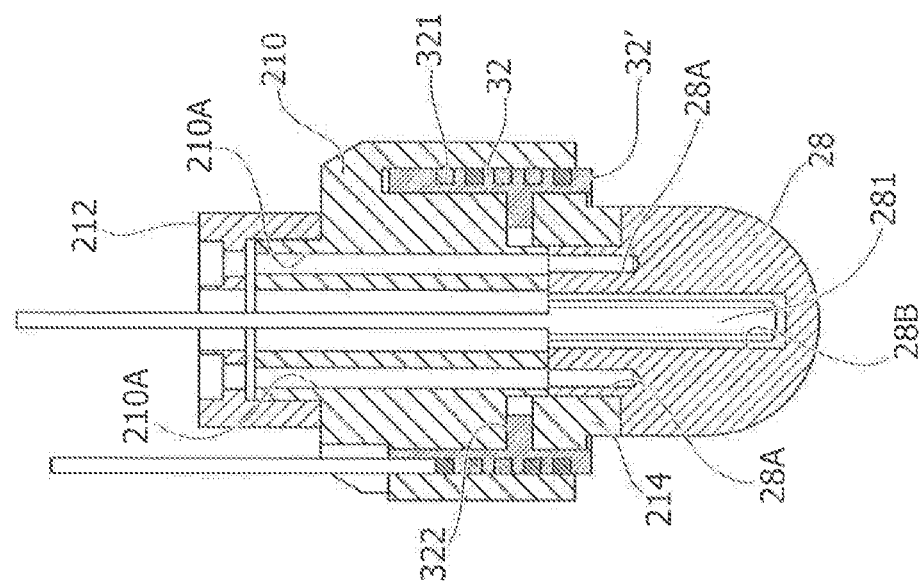
FIG. 5 illustrates an embodiment of the thermoforming device described herein, according to an axonometric view.
Figure 6:
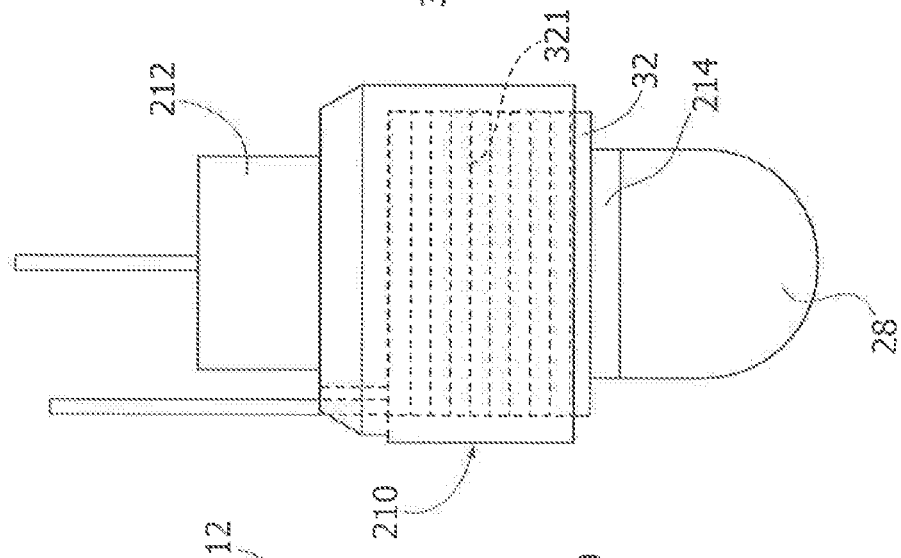
FIG. 6 illustrates the device of FIG. 5 according to a front view.
Figure 7:
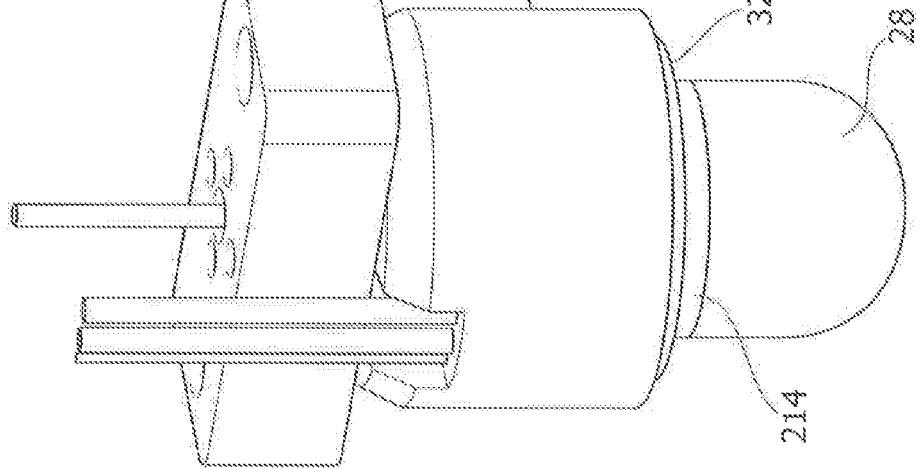
FIG. 7 illustrates the device of FIG. 5 according to a cross-sectional view along a vertical plane.

With reference now to FIGS. 5 to 7, these represent a preferred embodiment of the forming device 24 of FIGS. 4A-C).

In various embodiments, as in the one illustrated, the device 24 comprises a base body 210 made of thermally insulating material, which carries the two heated bodies 28 and 32 on the underside, and is fixed at the top to a supporting beam 212. Preferably, this body is made of polyether ether ketone (PEEK).

In various preferred embodiments, as in the one illustrated, the body 32 has a hollow cylindrical shape; its bottom circular edge constitutes the heated edge 32' referred to above.

The base body 210 has an annular seat having a corresponding shape, which houses the body 32; the latter may envisage an internal flange 322 designed to come to bear upon a corresponding surface of the seat to identify the correct position of installation of the body.

The body 28 is, instead, fixed on the base body 210 in a central region of this, which is surrounded by the edge 32' of the body 32.

Set between these two bodies is an annular element 214 made of insulating material, which is gripped between the internal flange 322 of the body 32 and a top edge of the body 28.

The central region of the base body 210 is traversed by through holes 210A, inserted in which, on the top side of the body 210, are screws (not illustrated), which engage, directly, respective threaded holes 28A provided on the top side of the body 28.

The bodies 28 and 32 are both made of metal material, for example brass, and applied thereon are resistive elements that constitute the electrical heating means mentioned above. For instance, in various preferred embodiments, as in the one illustrated, in the body 28 these resistive elements—which, as in the case of FIG. 7, are designated once again by the reference 281—are housed within a central hole 28B made in the body, which extends axially from its top side as far as in the proximity of the surface 28'. In the body 32, in various preferred embodiments, as in the one illustrated, the resistive elements 321 have, instead, the configuration of a coil that is housed within a corresponding groove made on the outer cylindrical surface of the body 32. The resistive elements 321 and 281 are supplied via wires that exit from the punch 26, on its top side.

The punch described above presents the advantage of having a relatively simple structure, which is easy to install and very compact.

Thanks to its base body 210, made completely of insulating material, this device moreover affords the advantage of limiting considerably dispersion of heat. It encloses in fact the body 32 almost completely inside it, allowing practically just the edge 32' to project outwards, on its underside.

This aspect is important not only because it enables the forming system to consume as a whole less energy, but also because it enables a number of forming heads to be associated to one another, within a single device, without there being any risk of overheating the environment, a circumstance that could instead jeopardize both the structure of the sheet treated and operation of the production equipment.

The packaging process described herein may be used in different fields.

In particular, in the foodstuff field, and above all in the context of confectionery products, this process may be of great interest in so far as it can be exploited for producing packages constituted by very thin sheets made entirely of plastic material, which are appropriately shaped so as to present the product contained therein more effectively.

In this connection, FIG. 1 illustrates, by way of non-limiting example, a particular package 20, which constitutes the secondary wrapping for a praline P already wrapped in a primary wrapping such as an aluminium foil. This package is made up of the shaped sheet 10 of FIG. 3B obtained using the process described herein, coupled to which is a further sheet 30 made of the same material or else of a different material.

It is clear that the package 20 formed by the two sheets 10 and 30 may also be used as primary wrapping of the praline P.

In any case, within this package, the sheet 10 is able to meet given needs, namely:

it is thin and transparent, to enable the consumer to see the praline wrapped in its primary wrapping or else directly the unwrapped praline;

it is shaped so that it adheres to the product both for aesthetic reasons and for functional reasons in terms of space, in the perspective of providing a compact package that is easy to pack; and it guarantees a hermetic seal of the package.

Figure 8:
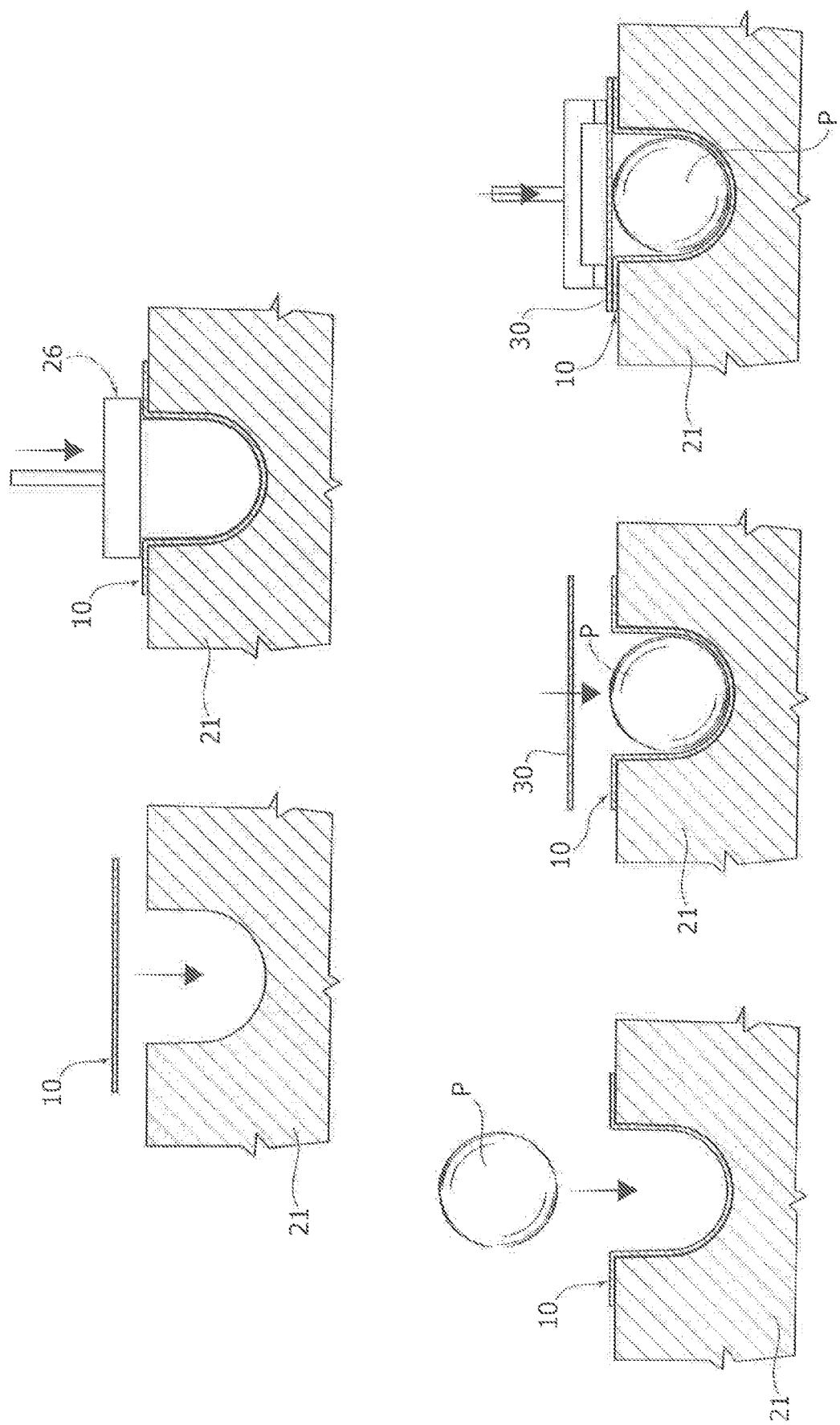
FIG. 8 is a schematic illustration of an embodiment of the process described herein for the production of the package of FIG. 1.

FIG. 8 shows schematically the entire cycle of production of the package 20 of FIG. 1. It envisages a first step corresponding to the forming process described herein, where the shaped sheet 10 is obtained; then, the product is set within the housing provided on this sheet, and finally the second sheet 30 is applied on the latter and sealed.

In further embodiments, the package in question may be formed by two shaped sheets both obtained by the forming process here described, which are connected together, by welding, along the respective perimetral portions surrounding their shaped hollow portions.

Of course, without prejudice to the principle of the invention, the details of construction and the embodiments may vary, even significantly, with respect to what has been illustrated herein purely by way of non-limiting example, without thereby departing from the scope of the invention, as is defined in the annexed claims.

The invention claimed is:

1. A process for making a package (20) for foodstuff products comprising:
   providing a first sheet (10) of wrapping, made of plastic material, and forming therein at least one first, hollow, portion (11), which is delimited, at least partially, by a second, perimetral, portion of said first sheet (13);
   inserting a foodstuff product within said first, hollow, portion (11);
   applying a second sheet of wrapping in contact with said second, perimetral, portion (13) so as to close said hollow portion (11) with said product inside; and
   welding said second sheet (30) on said first sheet (10) along said second, perimetral, portion (11),
   wherein forming of said first sheet includes:
   providing a mould (21) having a mould cavity (21');
   providing a forming device (26) designed to co-operate with said mould cavity (21') for forming said first sheet;
   setting said first sheet (10) on said mould (21) and making on said first sheet, via said forming device (26), said first, hollow, portion (11) delimited by said second, perimetral, portion (13); wherein said first sheet of wrapping (10) has a thickness of less than or equal to 140 μm, and in that forming of said first sheet includes:
   providing said mould with a mould surface (221') that surrounds said mould cavity (21');
   providing a first forming body (32) of the forming device (26) configured for pressing said first sheet of wrapping against said mould surface (221');
   during said step of formation of said first, hollow, portion (11), forming on at least said second portion (13) a series of pleats (122) identified by respective folding lines (122') of said first sheet of wrapping that are oriented towards said hollow portion, wherein each folding line joins together two pleat sides of the respective pleat; and via said first forming body (32) and said mould surface (221'), sealing said pleats (122) so as to prevent re-opening thereof;

squeezing said pleats (122) against said mould surface (221') so that said pleats (122) and their respective pleat sides remain contained in the same general plane of the second perimetral portion (13); and fixing said pleats squeezed against said mould surface in said position, via welding such that said pleats form an irregular arrangement.

2. The process according to claim 1, wherein said step of welding said second sheet (30) on said first sheet (10) along said second, perimetral, portion (13) is performed via said first forming body (32) according to a process of heat sealing, ultrasound welding, induction welding, etc.

3. The process according to claim 2, wherein said first forming body (32) is heated to a pre-determined temperature.

4. The process according to claim 2, wherein said mould surface (221') is heated to a pre-determined temperature.

5. The process according to claim 1, wherein said forming device comprises the first forming body (32) and a second forming body (28) designed to co-operate with said mould cavity (21') and the first forming body (32) configured for pressing said first sheet against said mould surface (221').

6. The process according to claim 5, wherein said first forming body (32) is heated to a pre-determined temperature, whereas said second forming body (28) is either not heated or else is heated to a lower pre-determined temperature.

7. The process according to claim 6, wherein the ratio between the lower and the higher temperature (measured in degree Celsius) is lower than or equal to 1:1.8.

8. The process according to claim 1, wherein said pleats (122) are squeezed in the generic plane defined as a whole by said second portion (13).

* * * * *